United States Patent
Smith et al.

(10) Patent No.: US 11,051,163 B1
(45) Date of Patent: Jun. 29, 2021

(54) SYSTEMS AND METHODS FOR ONE-CLICK TWO-FACTOR AUTHENTICATION

(71) Applicant: BlueOwl, LLC, Bloomington, IL (US)

(72) Inventors: Charles B. Smith, Livermore, CA (US); Charles O. Schwabacher, San Francisco, CA (US); Theobolt N. Leung, San Francisco, CA (US); Daniel O'Shea, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 254 days.

(21) Appl. No.: 15/977,190

(22) Filed: May 11, 2018

Related U.S. Application Data

(60) Provisional application No. 62/520,279, filed on Jun. 15, 2017, provisional application No. 62/506,701, filed on May 16, 2017.

(51) Int. Cl.
*H04W 12/06* (2021.01)
*H04L 29/06* (2006.01)

(52) U.S. Cl.
CPC ......... *H04W 12/06* (2013.01); *H04L 63/0876* (2013.01); *H04L 63/102* (2013.01); *H04L 63/123* (2013.01); *H04L 2463/082* (2013.01)

(58) Field of Classification Search
CPC .... G06Q 20/1085; G06Q 30/04; H04L 63/08; H04L 63/102; H04L 63/123; H04L 63/0876; H04L 2463/082; G06F 21/6245; H04W 12/06
USPC .......................................................... 713/193
See application file for complete search history.

(56) References Cited

U.S. PATENT DOCUMENTS

| | | | |
|---|---|---|---|
| 7,100,048 B1* | 8/2006 | Czajkowski | H04L 63/0428 713/153 |
| 8,365,258 B2 | 1/2013 | Dispensa | |
| 9,001,370 B1* | 4/2015 | Nuggehalli | H04N 1/00244 358/1.15 |
| 9,509,683 B2 | 11/2016 | Bauckman et al. | |
| 9,537,661 B2* | 1/2017 | Khalil | H04L 9/3268 |
| 9,852,276 B2 | 12/2017 | McEvoy et al. | |
| 9,967,742 B1 | 5/2018 | Belton, Jr. et al. | |
| 10,200,359 B1 | 2/2019 | Sokolov et al. | |
| 2003/0154406 A1 | 8/2003 | Honarvar et al. | |
| 2006/0156385 A1 | 7/2006 | Chiviendacz et al. | |
| 2007/0042755 A1 | 2/2007 | Singhal | |

(Continued)

*Primary Examiner* — Bryan F Wright
(74) *Attorney, Agent, or Firm* — Faegre Drinker Biddle & Reath LLP

(57) ABSTRACT

A system for one-click two-factor includes a processor and a non-transitory, tangible, computer-readable storage medium having instructions stored thereon that, in response to execution by the processor, cause the processor to perform operations including: (i) receiving an access request from a user, the access request including a first authentication factor; (ii) generating a second authentication factor and a hyperlink that includes the second authentication factor; (iii) providing the hyperlink that includes the second authentication factor to a client device associated with the user; (iv) automatically receiving the second authentication factor in response to selection of the hyperlink by the user; and (v) verifying the first authentication factor and the second authentication factor to authenticate the identity of the user.

15 Claims, 7 Drawing Sheets

(56) References Cited

U.S. PATENT DOCUMENTS

| | | |
|---|---|---|
| 2007/0073582 A1* | 3/2007 | Jung .................. G06Q 30/0235 705/14.16 |
| 2007/0136573 A1 | 6/2007 | Steinberg |
| 2008/0072294 A1* | 3/2008 | Chatterjee ............... H04L 63/08 726/4 |
| 2008/0098464 A1 | 4/2008 | Mizrah |
| 2008/0184351 A1* | 7/2008 | Gephart .............. H04L 63/1416 726/7 |
| 2009/0006858 A1 | 1/2009 | Duane et al. |
| 2010/0299731 A1 | 11/2010 | Atkinson |
| 2012/0017268 A9 | 1/2012 | Dispensa |
| 2013/0185775 A1 | 7/2013 | Dispensa |
| 2014/0047510 A1 | 2/2014 | Belton et al. |
| 2014/0058951 A1* | 2/2014 | Kuppuswamy ..... G06F 21/6245 705/67 |
| 2014/0358777 A1* | 12/2014 | Gueh ................. G06Q 20/1085 705/43 |
| 2015/0178784 A1* | 6/2015 | Oliver ................ G06Q 30/0267 705/14.64 |
| 2015/0312236 A1* | 10/2015 | Ducker ................... H04L 63/08 726/4 |
| 2015/0334564 A1 | 11/2015 | McClure et al. |
| 2016/0098779 A1* | 4/2016 | Wilczek ................ G06Q 30/04 705/26.8 |
| 2016/0286393 A1 | 9/2016 | Rasheed et al. |
| 2016/0373430 A1 | 12/2016 | Bhat et al. |
| 2017/0094510 A1 | 3/2017 | Khosravi et al. |
| 2017/0171199 A1 | 6/2017 | Bao et al. |
| 2017/0171200 A1 | 6/2017 | Bao et al. |
| 2017/0257363 A1 | 9/2017 | Franke et al. |
| 2018/0069864 A1 | 3/2018 | Cernoch et al. |

* cited by examiner

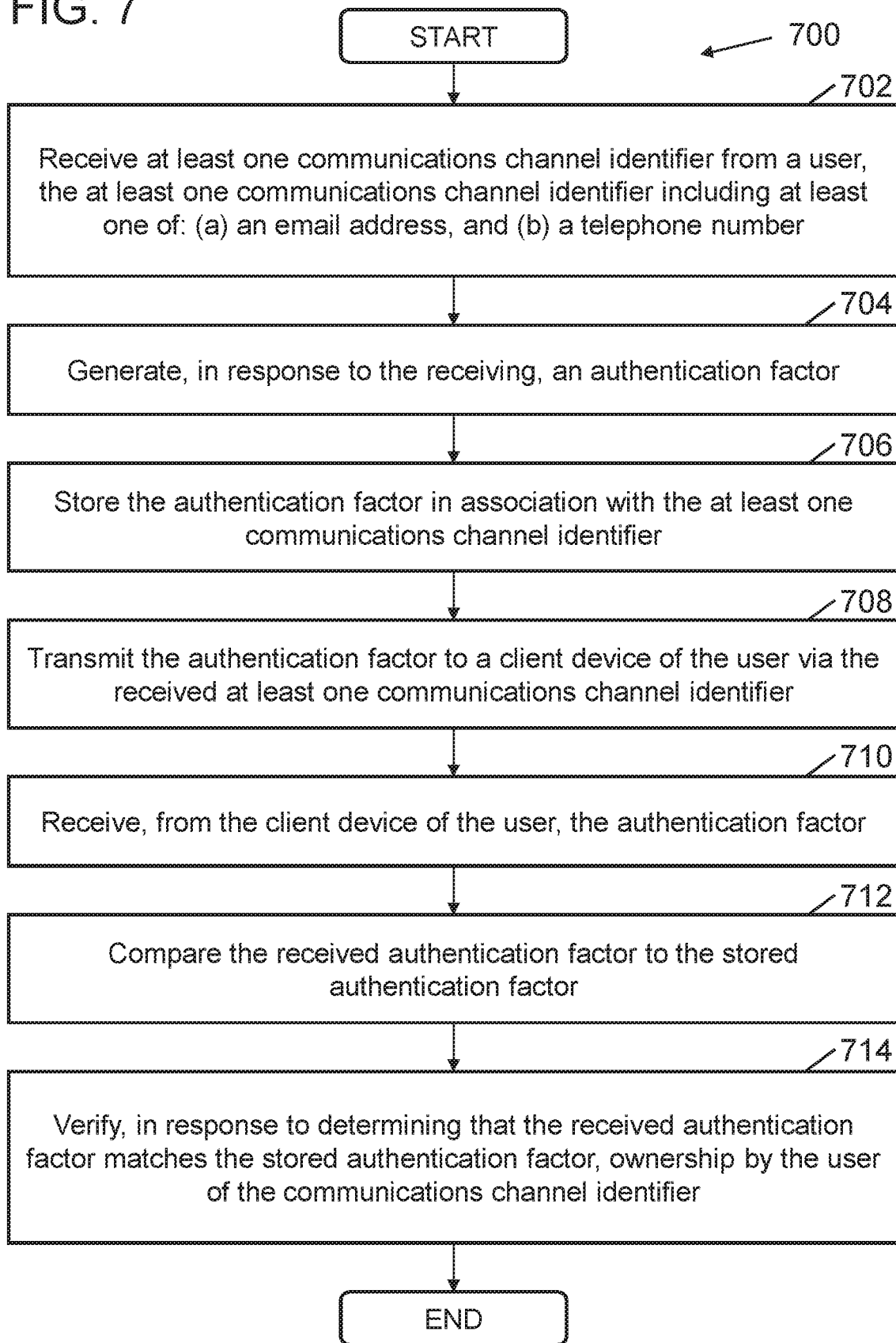

SYSTEMS AND METHODS FOR ONE-CLICK TWO-FACTOR AUTHENTICATION

CROSS-REFERENCE TO RELATED APPLICATIONS

This application claims the benefit of priority to U.S. Provisional Patent Application No. 62/520,279 filed Jun. 15, 2017, entitled "SYSTEMS AND METHODS FOR ONE-CLICK TWO-FACTOR AUTHENTICATION," and U.S. Provisional Patent Application No. 62/506,701, filed May 16, 2017, entitled "SYSTEMS AND METHODS FOR ONE-CLICK TWO-FACTOR AUTHENTICATION", the entire contents and disclosure of which are hereby incorporated herein by reference in their entirety.

FIELD OF THE INVENTION

The present disclosure relates to systems and methods for one-click two-factor authentication. More particularly, the present disclosure relates to systems and methods for authenticating a user's identity based upon at least two factors, wherein at least one of the factors is delivered to the user in a hyperlink, and the user is authenticated to the system in response to selection of the hyperlink.

BACKGROUND

Conventional multi-factor authentication systems, such as two-factor authentication systems, may require that a user present at least two pieces of information for authentication to the system. Such systems may be configured to confirm a user's identity based upon the separate pieces of information provided by the user. For example, a traditional two-factor authentication system may authenticate the user based upon a password provided to the system by the user, and a second piece of information known only to the user, such as a one-time verification code, generated by the system and delivered to the user for the purpose of authenticating to the system at the time the user requests access. Accordingly, the user may authenticate to the system based upon two factors: the password associated with the user account, and the one-time verification code.

In systems that employ a one-time verification code, the code may be provided to a user by way of a secure (previously verified) communications channel, such as by way of an email address or a telephone number. The user may receive the code via the secure communications channel and, thereafter, provide the code to the system for authentication to the system. However, for security purposes, the code may include a large number of digits, and in order to provide the code to the system, the user may find it necessary to commit the code to memory or, if that is not feasible, to record the code, such as with a pen and paper. As the user attempts to navigate such an authentication process, the user may misremember the code, or, if the user has chosen to write the code down, at the very least, the user may be required to engage in a potentially time consuming and/or frustrating process of transcribing and entering the code. Thus, traditional two-factor authentication systems may be hampered by an inefficient and potentially error prone authentication factor delivery process. Conventional systems may have other drawbacks as well.

BRIEF SUMMARY

The present embodiments relate to systems and methods for one-click two-factor authentication. Systems and methods may enhance and expedite user authentication is a secure manner. The systems and methods may employ a streamlined, user-friendly, two-factor authentication process, such as a one-click two-factor authentication process. In one embodiment, a remote server may generate and send an email that verifies an email address while also passing an application download link that includes a verification code, eliminating the need for a user to manual copy or enter the code.

In one aspect, a computer system for one-click two-factor user authentication may be provided. In some exemplary embodiments, the computer system may include a processor and a non-transitory, tangible, computer-readable storage medium having instructions stored thereon that, in response to execution by the processor, cause the processor to perform operations including: (i) receiving an access request from a user, the access request including a first authentication factor; (ii) generating a second authentication factor and a hyperlink that includes the second authentication factor; (iii) providing the hyperlink that includes the second authentication factor to a client device associated with the user; (iv) automatically receiving the second authentication factor in response to selection of the hyperlink by the user; and/or (v) verifying the first authentication factor and the second authentication factor to authenticate the identity of the user. The computer system may include additional, less, or alternate functionality, including that discussed elsewhere herein.

In another aspect, a computer system for one-click two-factor authentication may be provided. In some exemplary embodiments, the system may include a processor and a non-transitory, tangible, computer-readable storage medium having instructions stored thereon that, in response to execution by the processor, cause the processor to perform operations including: (i) receiving a registration request from a user; (ii) generating, in response to the registration request, a user account, the user account associated with an account identifier and a first authentication factor; (iii) receiving at least one communications channel identifier from the user; (iv) storing the at least one communications channel identifier in association with the user account; (v) providing, via at least one hyperlink delivered to a client device of the user via the at least one communications channel identifier, a second authentication factor; (vi) receiving the second authentication factor in response to selection of the at least one hyperlink by the user; and/or (vii) verifying the second authentication factor to authenticate the identity of the user. The computer system may include additional, less, or alternate functionality, including that discussed elsewhere herein.

In yet another aspect, a computer-implemented method for one-click two-factor authentication may be provided. The method may include: (i) receiving, by a processor, an access request from a user, the access request including a first authentication factor; (ii) generating, by the processor, a hyperlink that includes a second authentication factor; (iii) providing by the processor, the hyperlink that includes the second authentication factor to a client device associated with the user; (iv) automatically receiving, by the processor, the second authentication factor in response to selection of the hyperlink by the user; and/or (v) verifying, by the processor, the first authentication factor and the second authentication factor to authenticate the identity of the user. The method may include additional, less, or alternate actions, including those discussed elsewhere herein.

In yet another aspect, a computer system for one-click user authentication may be provided. The computer system may include at least one processor configured to: (i) provide, via a wireless communications channel, an email associated with an Application, the email including (a) a download link used to access the Application, the download link including a verification code associated with the Application, and (b) a communications channel identifier; (ii) receive a user selection of the download link; (iii) extract, in response to the user selection of the download link, the communications channel identifier and the verification code from the email; (iv) verify the user based upon the communications channel identifier; (v) verify that the user is entitled to access to the Application based upon the verification code; and (vi) grant, in response to the verifications, the user permission to access the Application using a client device, such that the user is not required to manually enter the communications channel identifier or the verification code.

In yet another aspect, a computer system for one-click two-factor authentication may be provided. In some exemplary embodiments, the system may include a processor and a non-transitory, tangible, computer-readable storage medium having instructions stored thereon that, in response to execution by the processor, cause the processor to perform operations including: (i) receiving a registration request from a user; (ii) generating, in response to the registration request, a user account, the user account associated with an account identifier and a first authentication factor; (iii) receiving at least one communications channel identifier from the user; (iv) storing the at least one communications channel identifier in association with the user account; (v) providing, via at least one hyperlink delivered to a client device of the user via the at least one communications channel identifier, a second authentication factor; (vi) receiving the second authentication factor in response to selection of the at least one hyperlink by the user; and (vii) verifying the second authentication factor in conjunction with the communications channel identifier to verify ownership by the user of the communications channel identifier.

In yet another aspect, a computer system for one-click two-factor authentication may be provided. In some exemplary embodiments, the system may include a processor and a non-transitory, tangible, computer-readable storage medium having instructions stored thereon that, in response to execution by the processor, cause the processor to perform operations including: (i) receiving at least one communications channel identifier from a user, the at least one communications channel identifier including at least one of: (a) an email address, and (b) a telephone number; (ii) generating, in response to the receiving, an authentication factor; (iii) storing the authentication factor in association with the at least one communications channel identifier; (iv) transmitting the authentication factor to a client device of the user via the received at least one communications channel identifier; (v) receiving, from the client device of the user, the authentication factor; (vi) comparing the received authentication factor to the stored authentication factor; and (vii) verifying, in response to determining that the received authentication factor matches the stored authentication factor, ownership by the user of the communications channel identifier.

In yet another aspect, a computer system for one-click two-factor authentication may be provided. In some exemplary embodiments, the system may include a processor and a non-transitory, tangible, computer-readable storage medium having instructions stored thereon that, in response to execution by the processor, cause the processor to perform operations including: (i) receiving at least one communications channel identifier from a user; (ii) generating, in response to the receiving, an authentication factor; (iii) transmitting the authentication factor to a client device of the user via the received at least one communications channel identifier; (iv) receiving, from the client device of the user, the authentication factor; (v) comparing the received authentication factor to the stored authentication factor; and (vi) verifying, in response to determining that the received authentication factor matches the stored authentication factor, ownership by the user of the communications channel identifier.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 7 illustrates an exemplary process for one-click two-factor authentication that includes verifying a communications channel of a user, such as an email address and/or a telephone number, implemented using the computer system for one-click two-factor authentication shown in FIG. 1.

Figure 1:
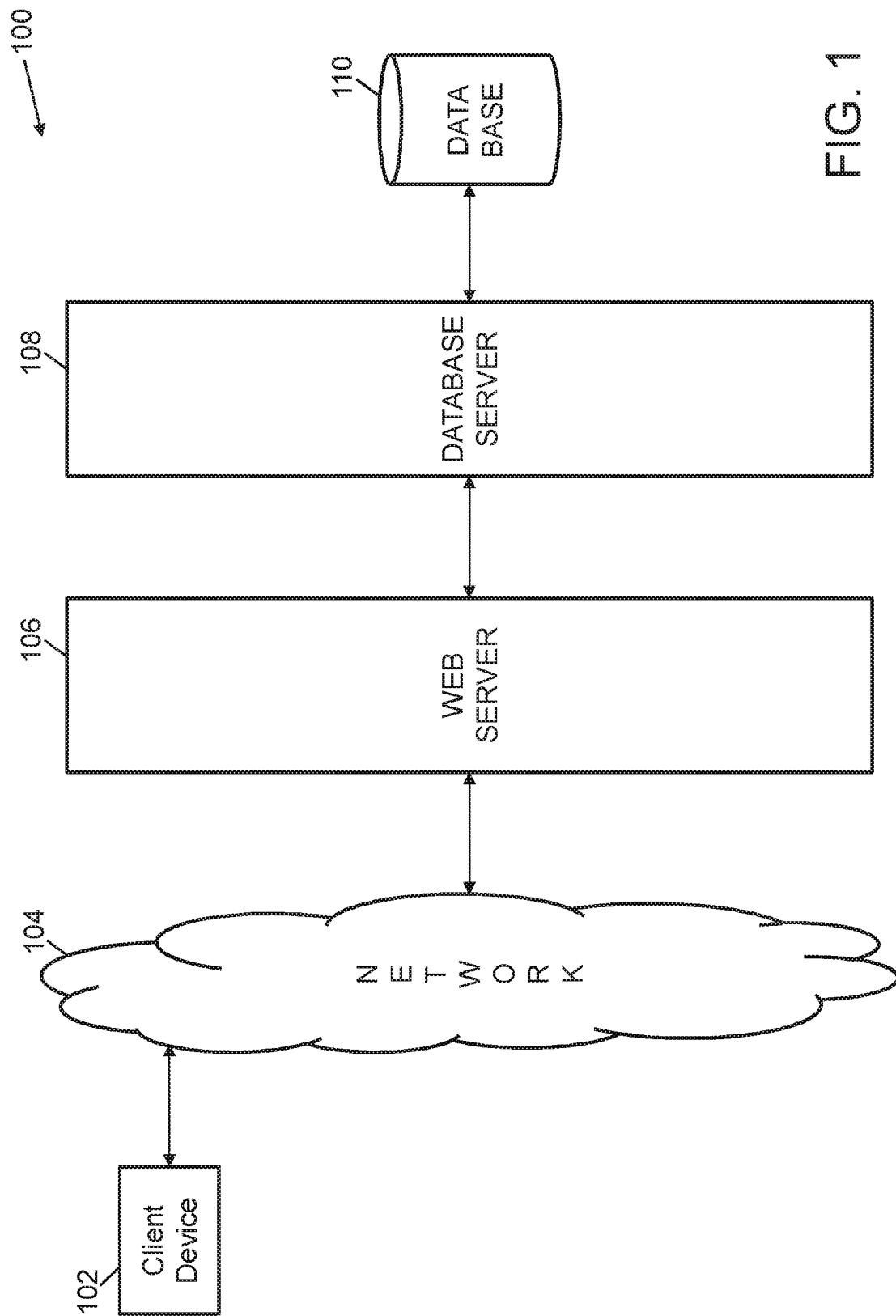
FIG. 1 illustrates a schematic diagram of an exemplary computer system for one-click two-factor authentication.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for one-click two-factor user authentication. In one exemplary embodiment, the process may be performed by at least one front-end system, such as a client device, and at least one back-end system, such as a web server and/or a database server.

Accordingly, the system may include a client device, such as a personal computer or a mobile communications device. The user may connect to the back-end system via the client device to initiate a one-click two-factor authentication process. More particularly, the backend system may deliver a webpage or a mobile application (e.g., an "app") to the client device. The webpage or app may prompt the user for a first set of credentials, such as an account identifier and a first authentication factor. In some embodiments, the account identifier is a username, and the first authentication factor is a password.

The user may provide the account identifier and password, and in response, the backend system may generate a second authentication factor, such as a numeric code, an alphanumeric code, and/or any other identifier, such as any other sequence of letters and/or numbers, which may be used as an authentication factor. The system may, in addition, embed the second authentication factor in a hyperlink, such as in a URL of the hyperlink and/or in the hypertext of the hyperlink. In addition, or alternatively, the system may construct the hyperlink such that the target of the hyperlink is a database that stores a record of the second authentication factor.

The system may deliver the hyperlink, including the second authentication factor, to the client device of the user, such as, for example, via a communications channel of the user. The communications channel may be any suitable communications channel, such as an email address and/or a mobile telephone number. In addition, the communications channel may be a verified communications channel, such as a communications channel verified during an account registration process.

To complete the authentication process, the user may select the hyperlink, such as by clicking on the hyperlink and/or rolling over the hyperlink. In response to this selection, the user's client device may parse the hyperlink to recover the second authentication factor (e.g., in the case that the second authentication factor is embedded in the hyperlink) and/or communicate with the backend database to which the hyperlink points to obtain the second authentication factor (e.g., in the case that the hyperlink target is a database that stores the second authentication factor). Having obtained the second authentication factor, the client device may transmit the second authentication factor to the backend system, which may authenticate the user by comparing the first authentication factor to stored first authentication factor and comparing the second authentication factor received from the client device to a stored second authentication factor. If both received factors match their corresponding stored factors, the user may be authenticated.

Thus, a user may authenticate to the system by way of a "one-click" two-factor authentication process, in that the user is not required, as described above, to commit the second authentication factor to memory or to write down the second authentication factor, such as with a pen and paper. In addition, the user is not required to manually provide the second authentication factor to the system, such as by way of a keypad or keyboard. Rather, from the perspective of the user, once the first authentication factor is entered, all that is necessary to complete the two-factor authentication process is selection of the hyperlink that includes the second authentication factor. Hence, the two-factor authentication process described herein greatly simplifies authentication to the system and spares the user the difficulty associated with many existing two-factor authentication systems.

This one-click two-factor authentication process may, in addition, be applied during an account registration process. For instance, a user may interact with a webpage or app to initiate an account registration process. During the process, the user may establish an account identifier (e.g., a username) and a first authentication factor (e.g., a password), and once the account is created, the system may generate and provide the second authentication factor, as described herein, such that the user is authenticated to the new account during the initial registration process based upon a single click or selection of a hyperlink including the second authentication factor.

In some embodiments, a communications channel associated with a user, such as a communications channel provided during a registration process, may be verified. For example, in various embodiments, the system may receive at least one communications channel identifier, such as an email address and/or a telephone number, from a user. The system may, in response, generate an authentication factor and/or store the authentication factor in association with the at least one communications channel identifier, such as, for example in a database. Further, in various embodiments, the system may transmit the authentication factor to a client device of the user via the received at least one communications channel identifier.

The user may receive, via the client device, the authentication factor, such as, for example, and as described herein, via a hyperlink that embeds and/or links to the authentication factor. The user may select the hyperlink in the client device, which may cause the client device to transmit the authentication factor to a backend portion of the system, such as a web server. In other embodiments, selection of the hyperlink may, as described herein, cause the system to retrieve the authentication factor from a database, where the authentication factor may be stored.

The system may thus receive the authentication factor (or a selection of the hyperlink that includes the authentication factor) from the client device of the user. In response, the system may compare the received authentication factor to the stored authentication factor and/or attempt to verify the received authentication factor against the stored authentication factor. In other words, if the received authentication factor matches the stored authentication factor, the system may verify ownership or possession by the user of the communications channel identifier. Thus, the system may use an authentication factor delivered by way of a hyperlink to verify ownership by a user of a communications channel. This verification process may be implemented by the system, in some embodiments, prior to a registration process, such that a user is not registered to a new account until the system verifies that the user has ownership of and/or possession of at least one communications channel provided by the user, such as during an account setup or registration process.

Exemplary technical effects of the systems, methods, and computer-readable media described herein may include, for example: (a) one-click two-factor authentication of a user based upon a first authentication factor, such as an account password, and a second authentication factor that is embedded in or otherwise tied to a hyperlink; and/or (b) one-click two-factor authentication of a user during an, and as part of, an account registration process.

Exemplary System for One-Click User Authentication

FIG. 1 depicts a view of an exemplary computer system 100 for one-click two-factor authentication. In one exemplary embodiment, system 100 may include a client device, such as a client device 102. Client device 102 may be associated with an individual, such as a user who has purchased, or who is interested in purchasing, an insurance policy. System 100 may also include network 104, a web server 106, a database server 108, and/or a database 110. In some embodiments, system 100 also includes wireless communications hardware, such as one or more transceivers, which may be communicatively coupled between client device 102 and network 104 to facilitate wireless communications between client device 102 and network 104.

Accordingly, in the exemplary, client device 102 may be any personal computing device and/or any mobile communications device of a user, such as a personal computer, a tablet computer, a smartphone, and the like. Client device 102 may be configured to present an application (e.g., a smartphone "app") or a webpage, such as webpage or an app for authenticating a user to system 100 and/or an account registration webpage or app. To this end, client device 102 may include or execute software, such as a web browser, for viewing and interacting with a webpage and/or an app.

Network 104 may be any electronic communications system, such as any computer network or collection of computer networks, and may incorporate various hardware and/or software. Communication over network 104 may be accomplished via wired communication, or wireless communication or data transmission over one or more radio frequency links or communication channels. For instance, communication over network 104 may be accomplished via any suitable communication channels, such as, for example, one or more telephone networks, one or more extranets, one or more intranets, the Internet, one or more point of interaction devices (e.g., point of sale devices, smart phones or mobile devices, cellular phones), various online and/or offline communications systems, such as various local area and wide area networks, and the like.

Web server 106 may be any computer or computer system that is configured to receive and process requests made via HTTP. Web server 106 may be coupled between client device 102, such as a mobile device, and database server 108. More particularly, web server 106 may be communicatively coupled to client device 102 via network 104. In various embodiments, web server 106 may be directly coupled to database server 108 and/or communicatively coupled to database server 108 via a network, such as network 104. Web server 106 may, in addition, function to store, process, and/or deliver one or more web pages and/or any other suitable content to client device 102. Web server 106 may, in addition, receive data, such as data provided to the app and/or webpage (as described herein) from client device 102 for subsequent transmission to database server 108.

In various embodiments, web server 106 may implement various hardware and/or software, such as, for example, one or more communication protocols, one or more message brokers, one or more data processing engines, one or more servlets, one or more application servers, and the like. For instance, in one embodiment, web server 106 may implement an Internet of Things (IoT) protocol, such as a machine-to-machine IoT communications protocol (e.g. an MQTT protocol). In addition, in various embodiments, web server 106 may implement a message broker program module configured to translate a message or communications from a messaging protocol of a sending device to a messaging protocol of a receiving device (e.g., RABBITMQ, KAFKA, ACTIVEMQ, KESTREL). Further still, in some embodiments, web server 106 may implement a data processing engine, such as a cluster computing framework like APACHE SPARK. In addition, in various embodiments, web server 106 may implement servlet and/or JSP server, such as APACHE TOMCAT.

Database server 108 may be any computer or computer program that provides database services to one or more other computers or computer programs. In various embodiments, database server 108 may be communicatively coupled between web server 108 and database 110. Database server 108 may, in addition, function to process data received from web server 106, such as authentication data, which may include, for example, a first authentication factor and/or a second authentication factor.

Database 110 may be any organized collection of data, such as, for example, any data organized as part of a relational data structure, any data organized as part of a flat file, and the like. Database 110 may be communicatively coupled to database server 108 and may receive data from, and provide data to, database server 108, such as in response to one or more requests for data, which may be provided via a database management system (DBMS) implemented on database server 108. In various embodiments, database 110 may be a non-relational database, such as an APACHE HADOOP database.

Although the components of system 100 are described below and depicted at FIG. 1 as being interconnected in a particular configuration, it is contemplated that the systems, subsystems, hardware and software components, various network components, and database systems described herein may be variously configured and interconnected and may communicate with one another within system 100 to facilitate the processes and advantages described herein. For example, although a single web server 112, a single database server 114, and a single database 116 are described above, it will be appreciated that system 100 may include any suitable number of interconnected, communicatively coupled, web servers, database servers, and/or databases. Further, although certain functions, processes, and operations are described herein with respect to one or more system components, it is contemplated that one or more other system components may perform the functions, processes, and operations described herein.

Exemplary Client Device

Figure 2:
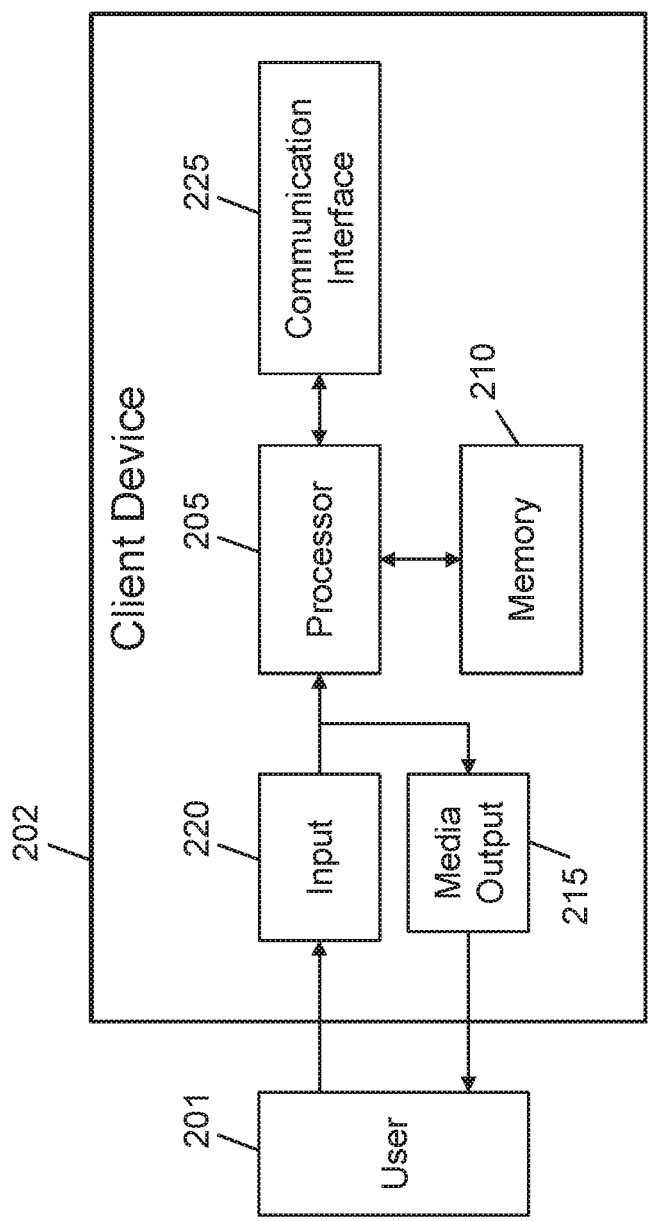
FIG. 2 illustrates an exemplary configuration of a client device shown in FIG. 1, in accordance with one embodiment of the present disclosure.

FIG. 2 depicts an exemplary configuration of a client device 202, such as client device 102, as shown in FIG. 1, and in accordance with one embodiment of the present disclosure. Client device 202 may be operated by a user 201. Client device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or transaction data to be stored and retrieved. Memory area 210 may include one or more computer readable media.

Client device 202 may also include at least one media output component 215 for presenting information to user 201. Media output component 215 may be any component capable of conveying information to user 201. In some embodiments, media output component 215 may include an output adapter (not shown) such as a video adapter and/or an audio adapter. An output adapter may be operatively coupled to processor 205 and adapted to operatively couple to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 215 may be configured to present a graphical user interface (e.g., a web browser and/or a client application) to user 201. A graphical user interface may include, for example, an online store interface for viewing and/or purchasing items, and/or a wallet application for managing payment information. In some embodiments, client device 202 may include an input device 220 for receiving input from user 201. User 201 may use input device 220 to, without limitation, select and/or enter data, such as, for example, one or more report criteria or report filters.

Input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 215 and input device 220.

Client device 202 may also include a communication interface 225, communicatively coupled via network 110 to web server 112 (shown in FIG. 1). Communication interface 225 may include, for example, a wired or wireless network adapter and/or a wireless data transceiver for use with a mobile telecommunications network.

Stored in memory area 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website.

Exemplary Database System

Figure 3:
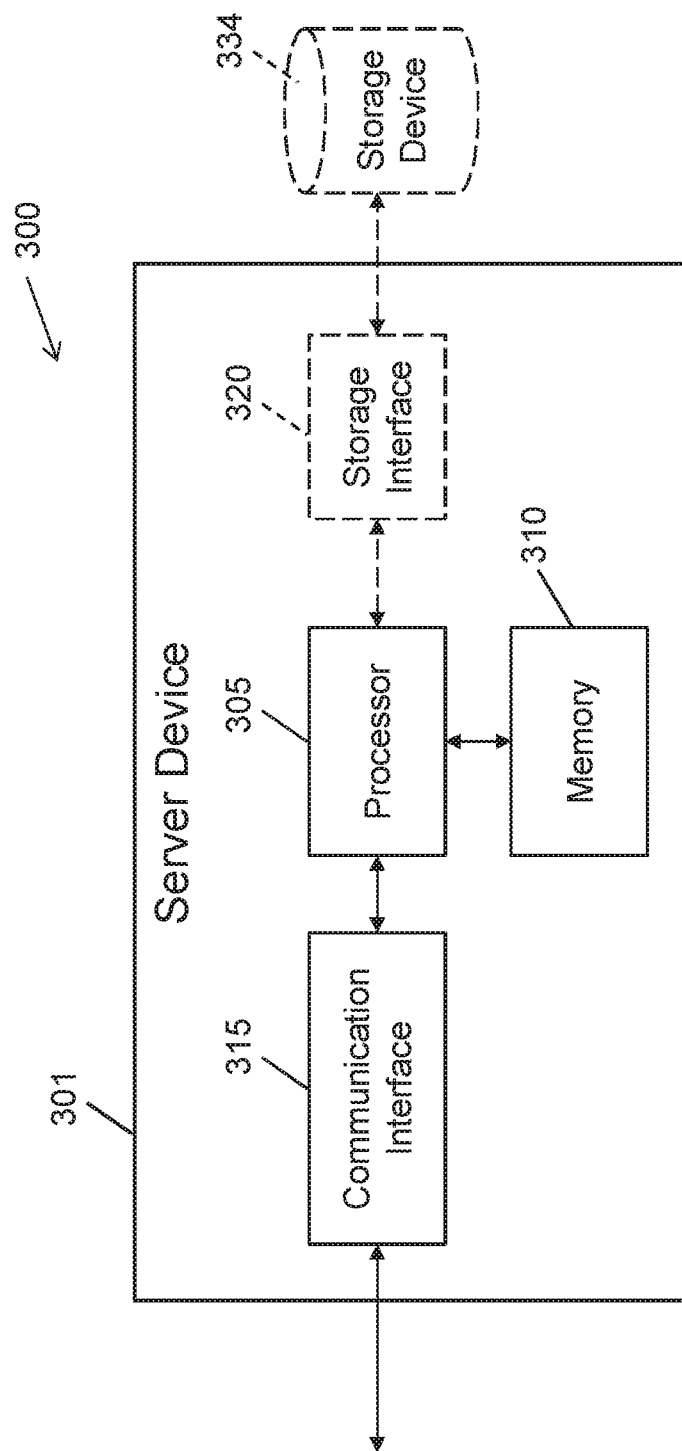
FIG. 3 illustrates an exemplary configuration of a server shown in FIG. 1, in accordance with one embodiment of the present disclosure.

FIG. 3 depicts an exemplary server system 300 such as database server 108 and database 110 or web server 106, as shown in FIG. 1, and in accordance with one exemplary embodiment of the present disclosure. Accordingly, server system 300 may include a server computer device 301 (e.g., database server 114), which may, in turn, include a processor 305 for executing instructions. Instructions may be stored in a memory area 310. Processor 305 may include one or more processing units (e.g., in a multi-core configuration).

Processor 305 may be operatively coupled to a communication interface 315 such that server computer device 301 is capable of communicating with a remote computing device, as described above. For example, communication interface 315 may receive requests from client device 202 via the Internet and/or over a computer network.

Processor 305 may also be operatively coupled to a storage device 334 (e.g., database 116). Storage device 334 may be any computer-operated hardware suitable for storing and/or retrieving data, such as, but not limited to, data associated with database 320. In some embodiments, storage device 334 may be integrated in server computer device 301. For example, server computer device 301 may include one or more hard disk drives as storage device 334.

In other embodiments, storage device 334 may be external to server computer device 301 and may be accessed by a plurality of server computer devices 301. For example, storage device 334 may include a storage area network (SAN), a network attached storage (NAS) system, and/or multiple storage units such as hard disks and/or solid state disks in a redundant array of inexpensive disks (RAID) configuration.

In some embodiments, processor 305 may be operatively coupled to storage device 334 via a storage interface 320. Storage interface 320 may be any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Exemplary Process for One-Click Two-Factor Authentication

Figure 4:
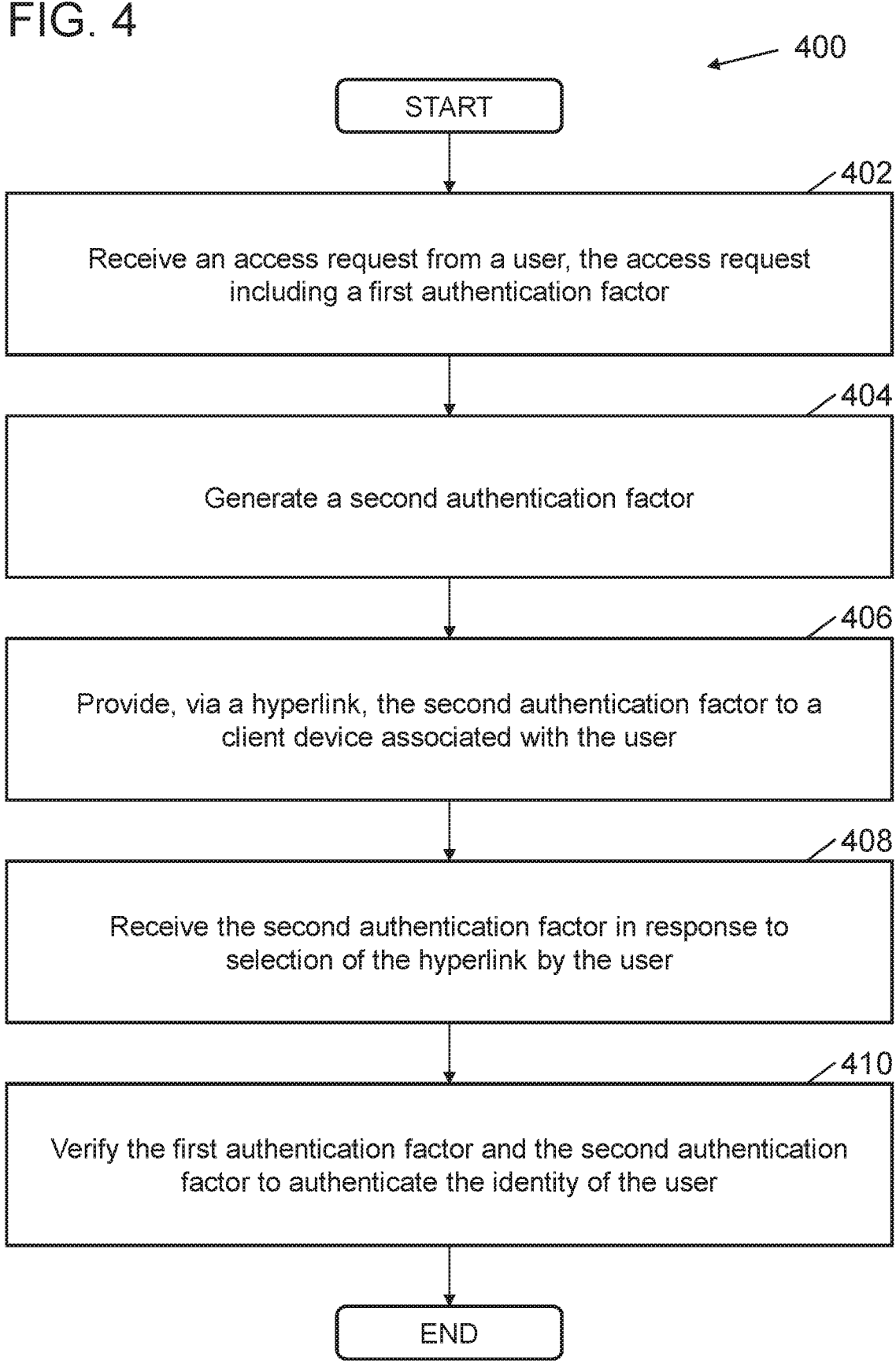
FIG. 4 illustrates an exemplary process for one-click two-factor authentication of a user using the computer system shown in FIG. 1.

FIG. 4 depicts a flowchart of an exemplary computer-implemented process 400 implemented using computer system 100 (shown in FIG. 1) for one-click two-factor authentication in which a user requests account access. For example, a user may request access to system 100, such as, in some embodiments, for the purpose of logging into an account. The account may, for instance, permit access to insurance policy information, such as auto insurance policy information, health insurance policy information, and the like. However, in various embodiments, the account may give the user access to other types of data and is not limited to an account associated with an insurance policy.

Accordingly, system 100 may initially receive an access request from a user, such as, for example, a request for account access (step 402). The user may initiate the access request from client device 102, such as from a webpage or app displayed by client device 102. The access request may include a first authentication factor, such as an account password, which the user may provide in conjunction with an account identifier, such as a username, to initiate authentication of the user's identity.

In response to receiving the first authentication factor, system 100 (e.g., web server 106 and/or database server 108) may generate a second authentication factor, such as, for example, a numeric code, an alphanumeric code, and/or any other unique code or sequence suitable for use as an authentication factor (step 404).

Having generated the second authentication factor, system 100 may provide the second authentication factor to client device 102 via a hyperlink (step 406). For example, system 100 may embed the second authentication factor in the hyperlink, such that the second authentication factor is visible in the URL associated with the hyperlink and/or such that the second authentication factor is visible in the hypertext of the hyperlink. In addition, or alternatively, system 100 may generate the hyperlink, such that the target of the hyperlink is a record stored in a database (e.g., database 110). More particularly, the hyperlink target may be a record of the second authentication factor, which system 100 may retrieve in response to selection by a user of the hyperlink. Thus, the hyperlink may provide access to the second authentication factor in several different ways.

System 100 may, in addition, provide the hyperlink to client device 102 by way of any suitable communication channel. For instance, system 100 may provide the hyperlink to an email address of the user, a telephone number of the user, and/or any other communications channel associated with the user and from which the user is able to retrieve the hyperlink. In various embodiments, system 100 may, however, only provide the hyperlink to a verified communications channel of the user. In various embodiments, possession of a communications channel may be verified, for example, by transmitting a communication or message to the channel that includes an instruction to select a hyperlink (which may or may not contain an authentication factor, as described herein). Selection of the hyperlink may cause client device 102 to transmit a communication to web server

106 indicating that the user received and selected the hyperlink in the communications channel.

Accordingly, to authenticate to system 100, in the exemplary embodiment, the user may select the hyperlink that includes the second authentication factor, such as by clicking on the hyperlink, rolling over they hyperlink with a cursor, and the like. In response to selection of the hyperlink, client device 102 may obtain or receive the second authentication factor (step 408). For example, client device 102 may parse the hyperlink to extract the second authentication factor from the hyperlink (and/or hypertext), such as, for example, in the instance that the second authentication factor is embedded (as described above) in the hyperlink. Alternatively, or in addition, client device 102 may communicate with database 110 to retrieve the second authentication factor, such as, for example, in the instance that the target of the hyperlink is a database record that includes or stores the second authentication factor. In both cases, however, client device 102 may obtain or receive the second authentication factor.

Having obtained the second authentication factor, client device 102 may transmit the second authentication factor the web server 106 and/or database server 108. In response to receiving the second authentication factor (as well as the first authentication factor, as described above), web server 106 and/or database server 108 may verify each of the first authentication factor and the second authentication factor to authenticate the identity of the user (step 410). More particularly, web server 106 and/or database server 108 may compare the first authentication factor received from the user to a stored first authentication factor. Similarly, web server 106 and/or database server 108 may compare the second authentication factor received from the user to a stored second authentication factor. If both of the received first authentication factor and second authentication factor match the stored first authentication factor and stored second authentication factor, the identity of the user may be verified, and the user may be authenticated to the system 100, such that the user is granted access to system 100.

Thus, a user may authenticate to system 100 by way process 400, which may be regarded as a "one-click" two-factor authentication process, in that the user is not required, as described above, to commit the second authentication factor to memory or to write down the second authentication factor, such as with a pen and paper. In addition, the user is not required to manually provide the second authentication factor to system 100, such as by way of a keypad or keyboard. Rather, from the perspective of the user, once the first authentication factor is entered, all that is necessary to complete the two-factor authentication process is selection of the hyperlink that includes the second authentication factor. Hence, the two-factor authentication process described herein greatly simplifies and expedites authentication to system 100, and spares the user the difficulty associated with many existing two-factor authentication systems.

Figure 5:
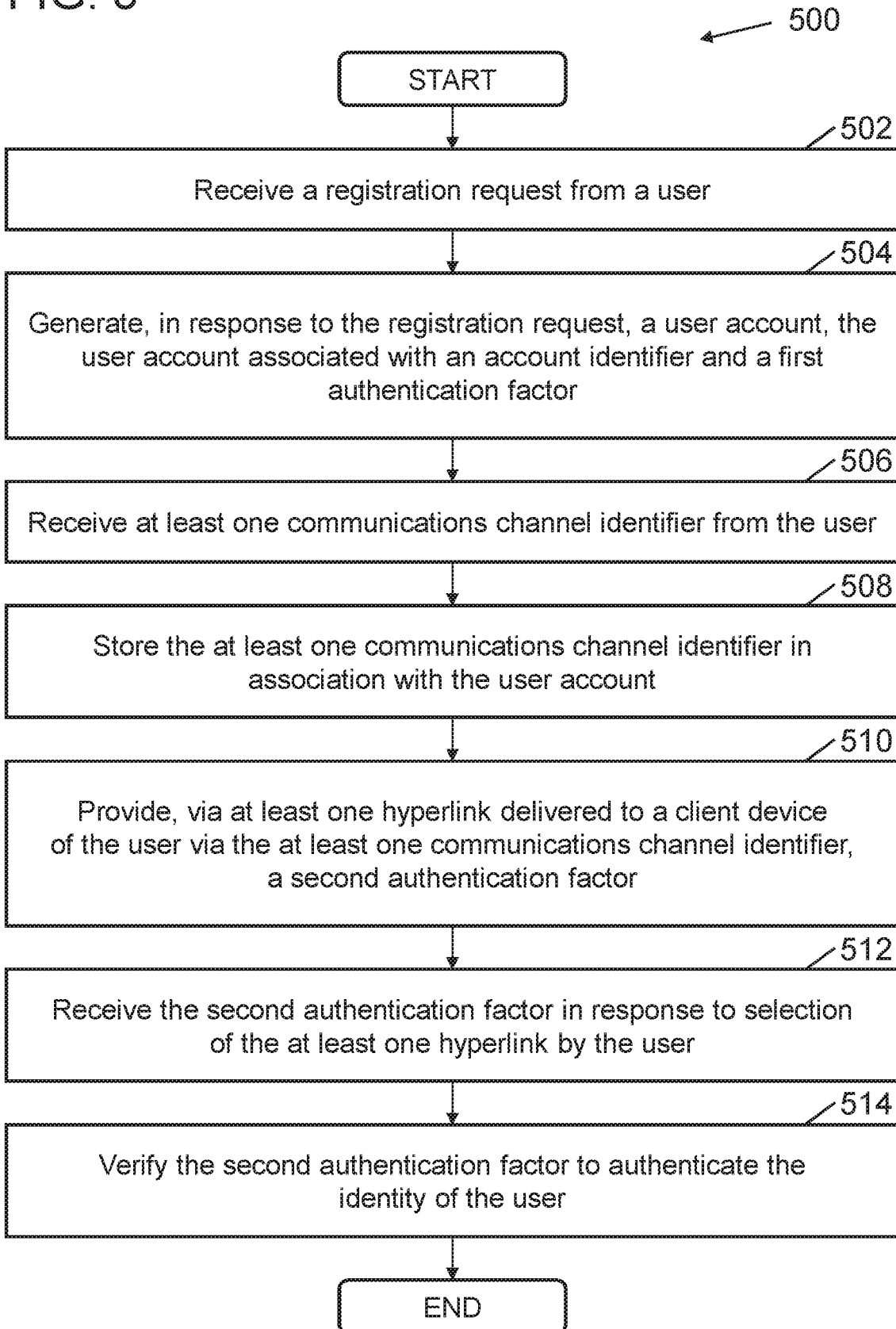
FIG. 5 illustrates an exemplary process for one-click two-factor authentication of a user in which a user registers for an account using the computer system for one-click two-factor authentication shown in FIG. 1.

Exemplary Process for One-Click Two-Factor Authentication Including User Registration FIG. 5 depicts a flow chart of an exemplary computer-implemented process 500 implemented using computer system 100 (shown in FIG. 1) for one-click two-factor authentication in which a user is registered with system 100 and in which an account is created for the user. For example, a user may request access to system 100, such as, in some embodiments, for the purpose of creating an account. The account may, for instance, permit the user to apply for an insurance policy, such as an auto insurance policy, a health insurance policy, and the like. However, in various embodiments, the account may be any type of account, which may or may not be associated with an insurance policy. Rather, in general terms, process 500 may be applied to any registration process in which it is desirable to establish one-click two-factor authentication process.

Accordingly, system 100 may receive a registration request from a user, such as, for example, via a webpage or app displayed by client device 102 (step 502). System 100 (e.g., web server 106 and/or database server 108) may, in response, a user account (step 504). The user account may be associated with an account identifier, such as a username, and a first authentication factor (or "verification code"), such as a password.

In addition, during registration, system 100 may receive, from the user, at least one communications channel identifier (or, for simplicity, "user identifier") (step 506). The communications channel identifier may identify a communications channel, such as an email account or telephone number, of the user. Thus, the communications channel identifier may be an email address, a telephone number, such as a mobile telephone number, and the like. System 100 may, in addition, store the at least one communications channel identifier in association with the user account. For example, system 100 may store the at least one communications channel identifier in database 110. In various embodiments, system 100 may verify the communications channel associated with the communications channel identifier, such as, for example, as described below with reference to FIG. 7.

Having created the user account, system 100 may generate a second authentication factor (or "verification code"), such as, for example, a numeric code, an alphanumeric code, and/or any other sequence which may be used as an authentication factor. System 100 may, in addition, provide the second authentication factor to client device 102 via at least one hyperlink (step 510). More particularly, system 100 may provide the second authentication factor to client device 102 via any of the communications channels provided by the user during registration, as described above. System 100 may, in addition, provide the second authentication factor to more than one communications channel. For example, system 100 may deliver the second authentication factor via email as well as via an SMS message delivered to the user's mobile telephone.

To deliver the second authentication factor, system 100 may embed the second authentication factor in the hyperlink, such that the second authentication factor is visible in the URL associated with the hyperlink and/or such that the second authentication factor is visible in the hypertext of the hyperlink. In addition, or alternatively, system 100 may generate the hyperlink, such that the target of the hyperlink is a record stored in a database (e.g., database 110). More particularly, the hyperlink target may be a record of the second authentication factor, which system 100 may retrieve in response to selection by a user of the hyperlink. Thus, the hyperlink may provide access to the second authentication factor in several different ways. In addition, in some embodiments, the hyperlink may include a link to an Application (e.g., a "download link"), such as an Application for insurance (as described herein), which may, when selected by the user, grant access to the Application and/or cause the Application to be downloaded to client device 102. Further, in at least some embodiments, the hyperlink may be provided to client device 102 via any suitable communications channel and in any suitable communications format (e.g., via text message, email, and the like).

Accordingly, to authenticate to system 100, in the exemplary embodiment, the user may select the hyperlink that includes the second authentication factor, such as by clicking on the hyperlink, rolling over they hyperlink with a cursor, and the like. In response to selection of the hyperlink, client device 102 may obtain or receive the second authentication factor (step 512). For example, client device 102 may parse the hyperlink to extract the second authentication factor from the hyperlink (and/or hypertext), such as, for example, in the instance that the second authentication factor is embedded (as described above) in the hyperlink. Alternatively, or in addition, client device 102 may communicate with database 110 to retrieve the second authentication factor, such as, for example, in the instance that the target of the hyperlink is a database record that includes or stores the second authentication factor. In both cases, however, client device 102 may obtain or receive the second authentication factor.

Having obtained the second authentication factor, client device 102 may transmit the second authentication factor the web server 106 and/or database server 108. In response to receiving the second authentication factor (as well as the first authentication factor, as described above), web server 106 and/or database server 108 may verify each of the first authentication factor and the second authentication factor to authenticate the identity of the user (step 514). More particularly, web server 106 and/or database server 108 may compare the first authentication factor received from the user to a stored first authentication factor. Similarly, web server 106 and/or database server 108 may compare the second authentication factor received from the user to a stored second authentication factor. If both of the received first authentication factor and second authentication factor match the stored first authentication factor and stored second authentication factor, the identity of the user may be verified, and the user may be authenticated to the system 100, such that the user is granted access to system 100. Further, in at least some embodiments, the user may be granted access to an Application, such as an Application for insurance, in response to being authentication to system 100.

Thus, a user may register with and authenticate to system 100 by way process 500, which may be regarded as a "one-click" two-factor registration and authentication process, in that the user is not required, as described above, to commit the second authentication factor to memory or to write down the second authentication factor, such as with a pen and paper. In addition, the user is not required to manually provide the second authentication factor to system 100, such as by way of a keypad or keyboard. Rather, from the perspective of the user, once the first authentication factor is created and/or entered, all that is necessary to complete the two-factor registration and authentication process is selection of the hyperlink that includes the second authentication factor. Hence, the two-factor authentication process described herein greatly simplifies and expedites registration with and authentication to system 100, and spares the user the difficulty associated with many existing two-factor authentication systems, and the errors that may occur with conventional techniques Exemplary Process for Communications Channel Verification As described above, in some embodiments, system 100 may verify a communications channel associated with a user, such as a communications channel provided during computer-implemented registration process 500. Accordingly, FIG. 7 illustrates an exemplary computer-implemented process 700 implemented using computer system 100 (shown in FIG. 1) for verifying a communications channel of a user, such as an email address and/or a telephone number. Process 700 may be executed in conjunction with any of the other processes and/or systems described herein.

Accordingly, in various embodiments, system 100 may receive at least one communications channel identifier, such as an email address and/or a telephone number, from a user (step 702). System 100 may, in response, generate an authentication factor (such as, for example, and in various embodiments, a first and/or a second authentication factor, as described herein) (step 704). System 100 may, in addition, store the authentication factor in association with the at least one communications channel identifier, such as, for example in database 110 (step 706). Further, in various embodiments, system 100 may transmit the authentication factor to a client device of the user (e.g., client device 102) via the received at least one communications channel identifier (step 708).

The user may receive, via client device 102, the authentication factor, such as, for example, and as described herein, via a hyperlink that embeds and/or links to the authentication factor. The user may select the hyperlink in client device 102, which may cause client device to transmit the authentication factor to system web server 106. In other embodiments, selection of the hyperlink may, as described herein, cause system 100 to retrieve the authentication factor from database 110, where the authentication factor may be stored. System 100 may thus receive the authentication factor (or a selection of the hyperlink that includes the authentication factor) from the client device of the user (step 710). In response, system 100 may compare the received authentication factor to the stored authentication factor (step 712). Further, system 100 may, attempt to verify the received authentication factor against the stored authentication factor. In other words, if the received authentication factor matches the stored authentication factor, system 100 may verify ownership or possession by the user of the communications channel identifier (step 714). Thus, system 100 may use an authentication factor delivered by way of a hyperlink to verify ownership by a user of a communications channel. This verification process 700 may be implemented by system 100, in some embodiments, prior to registration process 500, such that a user is not registered to a new account until system 100 verifies that the user has ownership of and/or possession of at least one communications channel provided by the user, such as during an account setup or registration process.

In some embodiments, after a communications channel is verified (as described above), a user may be permitted to register for a new account and/or to login to an existing account. For example, in response to verification that a user owns or has possession of a communications channel, such as an email address and/or telephone number, system 100 may provide a hyperlink that includes a second authentication factor to the user via one or more verified communications channels. The user may receive the hyperlink in the communications channel, and in response to selection of the hyperlink (e.g., when the user "clicks on" the hyperlink), system 100 may prompt the user for the user's first authentication factor, such as an account password. In addition, and as described in greater detail above, system 100 may compare the first authentication factor to a stored first authentication factor and/or the second authentication factor provided to the user in the communications channel to a stored second authentication factor to authenticate the user, via a one-click two-factor authentication process, to the user's account and/or, in some cases, to register the user to a new account. For example, to register a user to a new account, system 100 may simply request that the user provide a new password (e.g., a new first authentication factor), in response to which system 100 may authentication the user to the newly created account as described herein.

Accordingly, in one aspect, a computer system for one-click two-factor authentication may include one or more local or remote processors, servers, and/or transceivers configured to: (1) receive a registration request from a user; (2) generate, in response to the registration request, a user account, the user account associated with an account identifier and a first authentication factor; (3) receive at least one communications channel identifier from the user; (4) store the at least one communications channel identifier in association with the user account; (5) provide, via at least one hyperlink delivered to a client device of the user via the at least one communications channel identifier, a second authentication factor; (6) receive the second authentication factor in response to selection of the at least one hyperlink by the user; and (7) verify the second authentication factor in conjunction with the communications channel identifier to verify ownership by the user of the communications channel identifier.

The at least one communications channel identifier may include at least one of: (a) an email address, and (b) a telephone number. Further, in various embodiments, the system may be further configured to store the second authentication factor in association with the at least one communications channel identifier, compare the received second authentication factor to the stored second authentication factor, and/or verify, in response to determining that the received second authentication factor matches the stored second authentication factor, ownership by the user of the communications channel identifier.

In another aspect, a computer system for one-click two-factor authentication may include one or more local or remote processors, servers, and/or transceivers configured to: (1) receive at least one communications channel identifier from a user, the at least one communications channel identifier including at least one of: (a) an email address, and (b) a telephone number; (2) generate, in response to the receiving, an authentication factor; (3) store the authentication factor in association with the at least one communications channel identifier; (4) transmit the authentication factor to a client device of the user via the received at least one communications channel identifier; (5) receive, from the client device of the user, the authentication factor; (7) compare the received authentication factor to the stored authentication factor; and (8) verify, in response to determining that the received authentication factor matches the stored authentication factor, ownership by the user of the communications channel identifier. Further, in various embodiments, the system may be configured to deliver the authentication factor to the client device of the user in a hyperlink.

In yet another aspect, a computer system for one-click two-factor authentication may include one or more local or remote processors, servers, and/or transceivers configured to: (1) receive at least one communications channel identifier from a user; (2) generate, in response to the receiving, an authentication factor; (3) transmit the authentication factor to a client device of the user via the received at least one communications channel identifier; (4) receive, from the client device of the user, the authentication factor; (5) compare the received authentication factor to the stored authentication factor; and (6) verify, in response to determining that the received authentication factor matches the stored authentication factor, ownership by the user of the communications channel identifier.

Further, in various embodiments, the computer system may be configured to deliver the authentication factor to the client device of the user in a hyperlink. Further still, in various embodiments, the communications channel identifier may be at least one of: (a) an email address, and (b) a telephone number. In addition, in various embodiments, the computer system may be configured to parse the hyperlink in response to selection by the user of the hyperlink and/or extract the authentication factor from the hyperlink. The computer system may also be configured, in some embodiments, to receive a selection by the user of the hyperlink and/or retrieve, from a database, the authentication factor based upon the hyperlink.

Exemplary Embodiments & Functionality

In one aspect, a computer system for one-click two-factor user authentication may be provided. In some exemplary embodiments, the system may include a processor and a non-transitory, tangible, computer-readable storage medium having instructions stored thereon that, in response to execution by the processor, cause the processor to perform operations including: (i) receiving an access request from a user, the access request including a first authentication factor; (ii) generating a second authentication factor; (iii) providing, via a hyperlink, the second authentication factor to a client device associated with the user; (iv) receiving the second authentication factor in response to selection of the hyperlink by the user; and/or (v) verifying the first authentication factor and the second authentication factor to authenticate the identity of the user. The system may include additional, less, or alternate functionality, including that discussed elsewhere herein.

In another aspect, a computer system for one-click two-factor authentication may be provided. In some exemplary embodiments, the system may include a processor and a non-transitory, tangible, computer-readable storage medium having instructions stored thereon that, in response to execution by the processor, cause the processor to perform operations including: (i) receiving a registration request from a user; (ii) generating, in response to the registration request, a user account, the user account associated with an account identifier and a first authentication factor; (iii) receiving at least one communications channel identifier from the user; (iv) storing the at least one communications channel identifier in association with the user account; (v) providing, via at least one hyperlink delivered to a client device of the user via the at least one communications channel identifier, a second authentication factor; (vi) receiving the second authentication factor in response to selection of the at least one hyperlink by the user; and/or (vii) verifying the second authentication factor to authenticate the identity of the user. The system may include additional, less, or alternate functionality, including that discussed elsewhere herein.

In yet another aspect, a computer-implemented method for one-click two-factor authentication may be provided. The method may include: (i) receiving, by a processor, an access request from a user, the access request including a first authentication factor; (ii) generating, by the processor, a second authentication factor; (iii) providing by the processor and via a hyperlink, the second authentication factor to a client device associated with the user; (iv) receiving, by the processor, the second authentication factor in response to selection of the hyperlink by the user; and/or (v) verifying, by the processor, the first authentication factor and the second authentication factor to authenticate the identity of the user. The method may include additional, less, or alternate actions, including those discussed elsewhere herein.

In yet another aspect, a computer-implemented method for one-click user authentication may be provided. The method may include: (i) receiving, via one or more processors and/or associated transceivers (such as by a mobile device processor) and/or via wireless communication and/or data transmission over one or more radio links or digital communication channels, an email associated with remotely or locally downloading and/or accessing an Application (such as via a wired or wireless communication network, e.g., internet), the email including (a) a download link used to download and/or access the Application, (b) a verification code associated with the Application, and/or (c) a user identifier, such as a user email address and/or a mobile device/processor identifier number, PIN, or unique IP address, (ii) extracting, via the one or more processors, the user identifier from the email (such as extracting the user email address or mobile device/processor identifier), (iii) verifying, via the one or more processors, the user identifier (e.g., compare the user email address or mobile device/processors identifier in the email with those located on or associated with the mobile device and/or processor), (iv) receiving, via the one or more processors, user selection of the download link used to download and/or access the Application, and/or (v) if the user identifier is verified, granting, via one or more local or remote processors, access to the Application using the mobile device to facilitate user access without requiring manual entry of text/verification codes.

In some embodiments, the email may be generated by a remote server, and transmitted to the mobile device via wireless communication or data transmission. In another aspect, upon user selection of the download link, the one or more processors and/or associated transceivers (and/or mobile device), transmit the verification code to the remote server; and are granted permission to download the Application to the mobile device, and/or to remotely access the Application once the remote server verifies the verification code.

In some embodiments, upon user selection of the download link, the one or more processors and/or associated transceivers (and/or mobile device), transmit the verification code to the remote server; and download and/or access the Application at the mobile device, once the verification code is remotely or locally verified. The foregoing methods may include additional, less, or alternate actions, including those discussed elsewhere herein.

In yet another aspect, a computer-implemented method for one-click user authentication may be provided. The method may include: (i) receiving, via one or more processors and/or associated transceivers (such as by a mobile device processor) and/or via wireless communication and/or data transmission over one or more radio links or digital communication channels, an email associated with an Application, the email including (a) a download link used to download and/or access the Application, (b) a verification code associated with the Application, and/or (c) a user identifier, such as a user email address and/or a mobile device identifier; (ii) extracting, via the one or more processors, the user identifier from the email (such as extracting the user email address or mobile device/processor identifier); (iii) verifying, via the one or more processors, the user identifier; (iv) receiving, via the one or more processors, user selection of the download link used to download and/or access the Application; and/or if the user identifier is verified, receiving and/or granting, via the one or more processors and/or transceivers, permission to download and/or access the Application using the mobile device to allow the mobile device to download/access the Application after the user is verified without the user being required to manually enter a user identifier and/or verification code.

In some embodiments, the computer-implemented method further comprises extracting the verification code, via the one or more processors, from the email, and transmitting, via the one or more processors and/or associated transceivers, the verification code back to a remote server that generated the email. In some embodiments the verification code and/or email is time sensitive and will expire after a period of time, such as 24 hours. The foregoing methods may include additional, less, or alternate actions, including those discussed elsewhere herein.

In yet another aspect, a computer system configured for one-click user authentication may be provided. The computer system may comprise one or more local or remote processors, servers, and/or transceivers configured to: (i) receive, such as by a mobile device processor and/or via wireless communication and/or data transmission over one or more radio links or digital communication channels, an email associated with remotely or locally downloading and/or accessing an Application (such as via a wired or wireless communication network, e.g., internet), the email including (i) a download link used to download and/or access the Application, (ii) a verification code associated with the Application, and/or (ii) a user identifier, such as a user email address and/or a mobile device/processor identifier number, PIN, or unique IP address; (ii) extract the user identifier from the email (such as extracting the user email address or mobile device/processor identifier); (iii) verify the user identifier (e.g., compare the user email address or mobile device/processors identifier in the email with those located on or associated with the mobile device and/or processor); (iv) receive user selection of the download link used to download and/or access the Application; and/or (v) if the user identifier is verified, grant access to the Application using the mobile device to facilitate avoiding requiring users to enter verification codes manually to download or otherwise access applications.

In some embodiments the email is generated by a remote server, and transmitted to the mobile device via wireless communication or data transmission. In another embodiment, upon user selection of the download link, the one or more processors and/or associated transceivers (and/or mobile device), transmit the verification code to the remote server; and are granted permission to download the Application to the mobile device, and/or to remotely access the Application once the remote server verifies the verification code. In yet another aspect, upon user selection of the download link, the one or more processors and/or associated transceivers (and/or mobile device), transmit the verification code to the remote server; and download and/or access the Application at the mobile device, once the verification code is remotely or locally verified. The system may include additional, less, or alternate functionality, including that discussed elsewhere herein.

In yet another aspect, a computer system configured for one-click user authentication is provided. The computer system may comprise one or more local or remote processors, transceivers, and/or servers configured to: (i) receive, such as by a mobile device processor and/or via wireless communication and/or data transmission over one or more radio links or digital communication channels, an email associated with an Application, the email including (a) a download link used to download and/or access the Application, (b) a verification code associated with the Application, and/or (c) a user identifier, such as a user email address and/or a mobile device identifier; (ii) extracting, via the one or more processors, the user identifier from the email (such as extracting the user email address or mobile device/processor identifier); (iii) verifying, via the one or more processors, the user identifier; (iv) receiving, via the one or more processors, user selection of the download link used to download and/or access the Application; and/or (v) if the user identifier is verified, receiving and/or granting, via the one or more processors and/or transceivers, permission to download and/or access the Application using the mobile device to allow the mobile device to download/access the Application after the user is verified without the user being required to manually enter a user identifier and/or verification code.

In some embodiments, the computer system further comprises extracting the verification code, via the one or more processors, from the email, and transmitting, via the one or more processors and/or associated transceivers, the verification code back to a remote server that generated the email. In another embodiment the verification code and/or email is time sensitive and will expire after a period of time, such as 24 hours. The system may include additional, less, or alternate functionality, including that discussed elsewhere herein.

In yet another aspect, a mobile device (or other computer system) is provided. The mobile device may be configured for one-click user authentication comprising: a means for receiving an email that verifies an email address, and passing along an application downlink link that includes a verification code associated with the application to facilitate eliminating the need for a user to copy, type, or cut and paste, the code to download and/or access the application using the mobile device. The system may include additional, less, or alternate functionality, including that discussed elsewhere herein.

In another aspect, a mobile device (or other computer system) is provided. The mobile device may be configured for one-click user authentication comprising: a means for receiving an email that verifies a mobile device, and passing along an application downlink link that includes a verification code associated with the application to facilitate eliminating the need for a user to manually copy, type, or cut and paste, the code to download and/or access the application using the mobile device. The system may include additional, less, or alternate functionality, including that discussed elsewhere herein.

In yet another aspect, a computer system configured for one-click user authentication is provided. The computer system may comprise one or more local or remote processors, servers, and/or transceivers configured to: (i) receive, such as by a mobile device processor and/or via wireless communication and/or data transmission over one or more radio links or digital communication channels, an email associated with remotely or locally downloading and/or accessing an Application (such as via a wired or wireless communication network, e.g., internet), the email including (a) a download link used to download and/or access the Application, the download link including a verification code, and/or (b) a user identifier, such as a user email address and/or a mobile device/processor identifier number, PIN, or unique IP address, the email including code configured to use the user identifier to verify the identity of the user and/or the mobile device; (ii) execute, via the mobile device, the code including within the email to verify the identity of the user and/or the mobile device, or otherwise verifying, via the mobile device, the identity of the user and/or the mobile device; and/or (iii) once the user and/or mobile device identity is verified, via the mobile device, downloading and accessing the Application upon user selection of the download link to facilitate eliminating the need for the user to copy, enter, or type in, the verification code manually.

In some embodiments, upon user selection of the download link, the mobile device extracts the verification code from the download link to facilitate download of, and/or access to, the Application. The system may include additional, less, or alternate functionality, including that discussed elsewhere herein.

In yet another aspect, a computer-implemented method for one-click user authentication is provided. The computer-implemented method may comprise, via one or more processors, transceivers, and/or servers: (i) receiving an email associated with remotely or locally downloading and/or accessing an Application (such as via a wired or wireless communication network, e.g., internet), the email including (a) a download link used to download and/or access the Application, the download link including a verification code, and/or (b) a user identifier, such as a user email address and/or a mobile device/processor identifier number, PIN, or unique IP address, the email including code configured to use the user identifier to verify the identity of the user and/or the mobile device; (ii) executing the code including within the email to verify the identity of the user and/or the mobile device, or otherwise verifying the identity of the user and/or mobile device; and/or (iii) once the user and/or mobile device identity are verified, download and/or access the Application upon user selection of the download link to facilitate eliminating the need for the user to copy, type, or otherwise enter in the verification code manually.

In some embodiments, upon user selection of the download link, the mobile device extracts the verification code from the download link to facilitate download of, and/or access to, the Application at the mobile device. The foregoing methods may include additional, less, or alternate actions, including those discussed elsewhere herein.

In yet another aspect, a computer-implemented method for one-click user authentication is provided. The computer-implemented method may comprise: (i) receiving, via one or more processors and/or associated transceivers (such as by a mobile device processor) and/or via wireless communication and/or data transmission over one or more radio links or digital communication channels, an email associated with an Application, the email including (a) a download link used to download and/or access the Application, the download link including a verification code associated with the Application, and/or (b) a user identifier, such as a user email address and/or a mobile device identifier; (ii) extracting, via the one or more processors, the user identifier from the email (such as extracting the user email address or mobile device/processor identifier) and the verification code from the email; (iii) verifying, via the one or more processors, the user using the user identifier, and verifying, via the one or more processors, that the user is entitled to access to the Application via the verification code; (iv) receiving, via the one or more processors, user selection of the download link used to download and/or access the Application; and/or (v) if the user and user access are both verified, receiving and/or granting, via the one or more processors and/or transceivers, permission to download and/or access the Application using the mobile device to allow the mobile device to download/access the Application after the user is verified without requiring the user to manually enter a user identifier or verification code. The method may include additional, less, or alternate actions, including those discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Exemplary Embodiments

Figure 6:
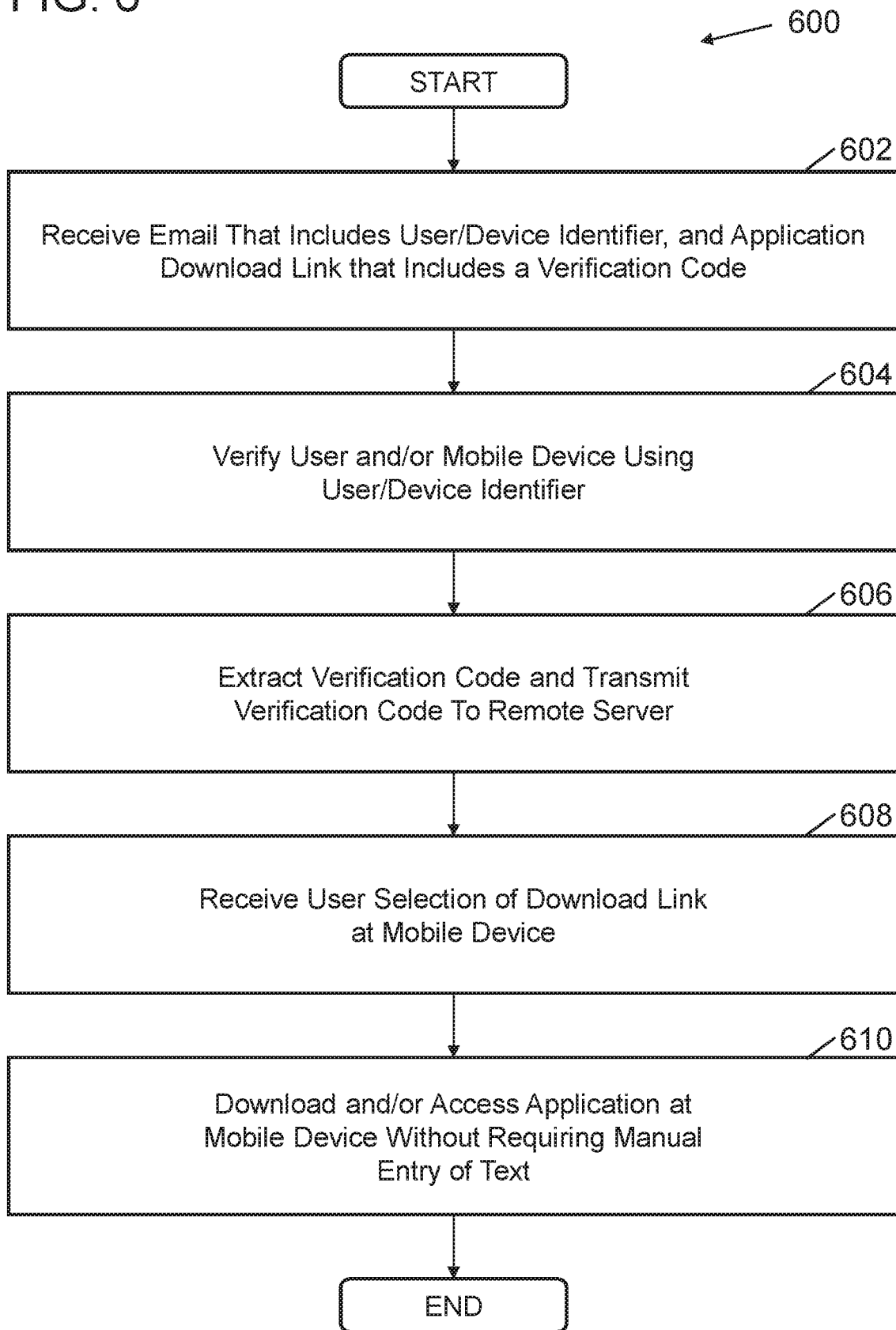
FIG. 6 illustrates an exemplary process for one-click two-factor authentication implemented using the computer system for one-click two-factor authentication shown in FIG. 1.

FIG. 6 depicts a computer-implemented method for one-click user authentication 600 implemented using computer system 100 (shown in FIG. 1) that alleviates requiring a user to manually enter text or verification codes. The method 600 may include receiving an email at a mobile device that includes a user and/or device identifier, and application download link that include a verification code 602. The method 600 may include extracting the user and/or mobile device identifier from the email, and verifying the user and/or mobile device using the user and/or device identifier 604. The method 600 may include extracting the verification code from the email, and/or transmitting the verification code to a remote server, such as a remote server generating the email 606. The method 600 may include receiving a user selection of the download link at the mobile device 608, and then downloading and/or accessing the application at the mobile device without requiring user manual entry of any text, passwords, or verification codes 610. The method may include additional, less, or alternate actions, including those discussed elsewhere herein.

For instance, in one aspect, a computer-implemented method for one-click user authentication, may be provided. The method may include (1) receiving, via one or more processors and/or associated transceivers (such as by a mobile device processor) and/or via wireless communication and/or data transmission over one or more radio links or digital communication channels, an email associated with remotely or locally downloading and/or accessing an Application (such as via a wired or wireless communication network, e.g., internet), the email including (i) a download link used to download and/or access the Application, (ii) a verification code associated with the Application, and/or (ii) a user identifier, such as a user email address and/or a mobile device/processor identifier number, PIN, or unique IP address; (2) extracting, via the one or more processors, the user identifier from the email (such as extracting the user email address or mobile device/processor identifier); (3) verifying, via the one or more processors, the user identifier (e.g., compare the user email address or mobile device/ processors identifier in the email with those located on or associated with the mobile device and/or processor); (4) receiving, via the one or more processors, user selection of the download link used to download and/or access the Application; and/or (6) if the user identifier is verified, granting, via one or more local or remote processors, access to the Application using the mobile device.

Further, the email may be generated by a remote server, and transmitted to the mobile device via wireless communication or data transmission. Upon user selection of the download link, the one or more processors and/or associated transceivers (and/or mobile device), transmit the verification code to the remote server; and are granted permission to download the Application to the mobile device, and/or to remotely access the Application once the remote server verifies the verification code. Additionally or alternatively, upon user selection of the download link, the one or more processors and/or associated transceivers (and/or mobile device), may transmit the verification code to the remote server; and download and/or access the Application at the mobile device, once the verification code is remotely or locally verified.

In another aspect, a computer-implemented method for one-click user authentication may be provided. The method may include (1) receiving, via one or more processors and/or associated transceivers (such as by a mobile device processor) and/or via wireless communication and/or data transmission over one or more radio links or digital communication channels, an email associated with an Application, the email including (i) a download link used to download and/or access the Application, (ii) a verification code associated with the Application, and/or (iii) a user identifier, such as a user email address and/or a mobile device identifier; (2) extracting, via the one or more processors, the user identifier from the email (such as extracting the user email address or mobile device/processor identifier); (3) verifying, via the one or more processors, the user identifier; (4) receiving, via the one or more processors, user selection of the download link used to download and/or access the Application; and/or (5) if the user identifier is verified, receiving and/or granting, via the one or more processors and/or transceivers, permission to download and/or access the Application using the mobile device to allow the mobile device to download/access the Application after the user is verified without the user being required to manually enter a user identifier and/or verification code.

The method also may include extracting the verification code, via the one or more processors, from the email, and transmitting, via the one or more processors and/or associated transceivers, the verification code back to a remote server that generated the email. The verification code and/or email may be time sensitive and expire after a period of time, such as 24 hours. The foregoing methods may include additional, less, or alternate actions, including those discussed elsewhere herein.

In another aspect, a computer system configured for one-click user authentication may include one or more local or remote processors, servers, and/or transceivers configured to: (1) receive, such as by a mobile device processor and/or via wireless communication and/or data transmission over one or more radio links or digital communication channels, an email associated with remotely or locally downloading and/or accessing an Application (such as via a wired or wireless communication network, e.g., internet), the email including (i) a download link used to download and/or access the Application, (ii) a verification code associated with the Application, and/or (ii) a user identifier, such as a user email address and/or a mobile device/processor identifier number, PIN, or unique IP address; (2) extract the user identifier from the email (such as extracting the user email address or mobile device/processor identifier); (3) verify the user identifier (e.g., compare the user email address or mobile device/processors identifier in the email with those located on or associated with the mobile device and/or processor); (4) receive user selection of the download link used to download and/or access the Application; and/or (5) if the user identifier is verified, grant access to the Application using the mobile device to facilitate avoiding requiring users to enter verification codes manually to download or otherwise access applications. The computer system may include additional, less, or alternate functionality, including that discussed elsewhere herein.

In another aspect, a computer system configured for one-click user authentication may include one or more local or remote processors, transceivers, and/or servers configured to: (1) receive, such as by a mobile device processor and/or via wireless communication and/or data transmission over one or more radio links or digital communication channels, an email associated with an Application, the email including (i) a download link used to download and/or access the Application, (ii) a verification code associated with the Application, and/or (ii) a user identifier, such as a user email address and/or a mobile device identifier; (2) extracting, via the one or more processors, the user identifier from the email (such as extracting the user email address or mobile device/processor identifier); (3) verifying, via the one or more processors, the user identifier; (4) receiving, via the one or more processors, user selection of the download link used to download and/or access the Application; and/or (5) if the user identifier is verified, receiving and/or granting, via the one or more processors and/or transceivers, permission to download and/or access the Application using the mobile device to allow the mobile device to download/access the Application after the user is verified without the user being required to manually enter a user identifier and/or verification code. The computer system may include additional, less, or alternate functionality, including that discussed elsewhere herein.

In another aspect, a mobile device (or other computer system) configured for one-click user authentication may include means for receiving an email that verifies an email address, and passing along an application downlink link that includes a verification code associated with the application to facilitate eliminating the need for a user to copy, type, or cut and paste, the code to download and/or access the application using the mobile device.

In another aspect, a mobile device (or other computer system) configured for one-click user authentication may include means for receiving an email that verifies a mobile device, and passing along an application downlink link that includes a verification code associated with the application to facilitate eliminating the need for a user to manually copy, type, or cut and paste, the code to download and/or access the application using the mobile device.

In another aspect, a computer system configured for one-click user authentication may include one or more local or remote processors, servers, and/or transceivers configured to: (1) receive, such as by a mobile device processor and/or via wireless communication and/or data transmission over one or more radio links or digital communication channels, an email associated with remotely or locally downloading and/or accessing an Application (such as via a wired or wireless communication network, e.g., internet), the email including (i) a download link used to download and/or access the Application, the download link including a verification code, and/or (ii) a user identifier, such as a user email address and/or a mobile device/processor identifier number, PIN, or unique IP address, the email including code configured to use the user identifier to verify the identity of the user and/or the mobile device; (2) execute, via the mobile device, the code including within the email to verify the identity of the user and/or the mobile device, or otherwise verifying, via the mobile device, the identity of the user and/or the mobile device; and/or (3) once the user and/or mobile device identity is verified, via the mobile device, download and access the Application upon user selection of the download link to facilitate eliminating the need for the user to copy, enter, or type in, the verification code manually. Upon user selection of the download link, the mobile device may extract the verification code from the download link to facilitate download of, and/or access to, the Application. The mobile device may include additional, less, or alternate functionality, including that discussed elsewhere herein.

In another aspect, a computer-implemented method for one-click user authentication may include, via one or more processors, transceivers, and/or servers: (1) receiving an email associated with remotely or locally downloading and/or accessing an Application (such as via a wired or wireless communication network, e.g., internet), the email including (i) a download link used to download and/or access the Application, the download link including a verification code, and/or (ii) a user identifier, such as a user email address and/or a mobile device/processor identifier number, PIN, or unique IP address, the email including code configured to use the user identifier to verify the identity of the user and/or the mobile device; (2) executing the code including within the email to verify the identity of the user and/or the mobile device, or otherwise verifying the identity of the user and/or mobile device; and/or (3) once the user and/or mobile device identity are verified, download and/or access the Application upon user selection of the download link to facilitate eliminating the need for the user to copy, type, or otherwise enter in the verification code manually. Upon user selection of the download link, the mobile device may extract the verification code from the download link to facilitate download of, and/or access to, the Application at the mobile device. The method may include additional, less, or alternate actions, including those discussed elsewhere herein.

In another aspect, a computer-implemented method for one-click user authentication may include (1) receiving, via one or more processors and/or associated transceivers (such as by a mobile device processor) and/or via wireless communication and/or data transmission over one or more radio links or digital communication channels, an email associated with an Application, the email including (i) a download link used to download and/or access the Application, the download link including a verification code associated with the Application, and/or (ii) a user identifier, such as a user email address and/or a mobile device identifier; (2) extracting, via the one or more processors, the user identifier from the email (such as extracting the user email address or mobile device/processor identifier) and the verification code from the email; (3) verifying, via the one or more processors, the user using the user identifier, and verifying, via the one or more processors, that the user is entitled to access to the Application via the verification code; (4) receiving, via the one or more processors, user selection of the download link used to download and/or access the Application; and/or (5) if the user and user access are both verified, receiving and/or granting, via the one or more processors and/or transceivers, permission to download and/or access the Application using the mobile device to allow the mobile device to download/access the Application after the user is verified without requiring the user to manually enter a user identifier or verification code. The method may include additional, less, or alternate actions, including those discussed elsewhere herein.

In another aspect, a computer system configured for one-click user authentication may include one or more local or remote processors, transceivers, and/or servers configured to: (1) receive, such as by a mobile device processor, and/or via wireless communication and/or data transmission over one or more radio links or digital communication channels, an email associated with an Application, the email including (i) a download link used to download and/or access the Application, the download link including a verification code associated with the Application, and/or (ii) a user identifier, such as a user email address and/or a mobile device identifier; (2) extract the user identifier from the email (such as extracting the user email address or mobile device/processor identifier), and the verification code from the email; (3) verify the user using the user identifier, and verify that the user is entitled to access to the Application via the verification code; (4) receive user selection of the download link used to download and/or access the Application; and/or (5) if (a) the user and (b) user access are both verified, receiving and/or granting permission to download and/or access the Application using the mobile device to allow the mobile device to download/access the Application after the user is verified without requiring the user to manually enter a user identifier or verification code. The system may include additional, less, or alternate functionality, including that discussed elsewhere herein.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A computer system for one-click user authentication, the computer system comprising:
   a remote server comprising a memory and a hardware processor;
   and a client device comprising a memory and a hardware processor;
   wherein the remote server is configured to provide, via a wireless communications channel to the client device, an email associated with an Application, the email including (i) a download link used to access the Application, the download link including a verification code associated with the Application, and (ii) a communications channel identifier, the verification code being embedded in the download link; wherein the client device is configured to receive a user selection on the client device of the download link;
   extract, in response to the user selection of the download link, the communications channel identifier and the verification code from the email, and send the extracted communications channel identifier and the extracted verification code to the remote server;
   wherein the remote server is configured to verify the user based upon the communications channel identifier extracted without requiring the user to manually enter the communications channel identifier;
   verify that the user is entitled to access to the Application based upon the verification code extracted without requiring the user to manually enter the verification code;
   and grant, in response to the verifications, the user permission to access the Application using the client device; wherein the remote server is configured to verify that the user is entitled to access the Application based upon the verification code by comparing the verification code extracted from the email to a stored verification code.

2. The computer system of claim 1, wherein the client device is communicatively coupled via at least one transceiver to the remote server.

3. The computer system of claim 1, wherein the communications channel identifier comprises at least one of a user email address and a client device identifier.

4. The computer system of claim 1, wherein the Application is an Application for insurance.

5. The computer system of claim 1, wherein the verification code associated with the Application is an authentication factor.

6. The computer system of claim 1, wherein the computer system is further configured to receive the communications channel identifier from the user prior to providing the email.

7. A computer system for one-click two-factor authentication, the computer system comprising:
   a remote server including a processor; and
   a non-transitory, tangible, computer-readable storage medium having instructions stored thereon that, in response to execution by the processor, cause the remote server to perform operations comprising:
   receiving a registration request from a client device;
   generating, in response to the registration request, a user account, the user account associated with an account identifier and a first authentication factor;
   receiving at least one communications channel identifier from the client device;
   storing the at least one communications channel identifier in association with the user account;
   providing, via at least one hyperlink delivered to the client device of the user via the at least one communications channel identifier, a second authentication factor embedded in the at least one hyperlink;
   receiving the second authentication factor in response to selection on the client device of the at least one hyperlink by the user; and
   verifying the second authentication factor, without requiring the user to manually enter the second authentication factor, in conjunction with the communications channel identifier to verify ownership by the user of the communications channel identifier;
   wherein the remote server is further configured to perform operations comprising:
   storing the second authentication factor in association with the at least one communications channel identifier;
   comparing the received second authentication factor to the stored second authentication factor; and
   verifying, in response to determining that the received second authentication factor matches the stored second authentication factor, ownership by the user of the communications channel identifier.

8. The computer system of claim 7, wherein the at least one communications channel identifier includes at least one of: (a) an email address, and (b) a telephone number.

9. The computer system of claim 7, wherein the remote server is further configured to perform operations comprising granting access to an Application in response to selection of the at least one hyperlink by the user.

10. The computer system of claim 7, wherein the at least one hyperlink is a download link configured to grant access to an Application.

11. A computer system for one-click two-factor authentication, the computer system comprising:
a remote server including a processor; and
a non-transitory, tangible, computer-readable storage medium having instructions stored thereon that, in response to execution by the processor, cause the remote server to perform operations comprising:
receiving at least one communications channel identifier from a client device, the at least one communications channel identifier including at least one of: (a) an email address, and (b) a telephone number;
generating, in response to the receiving, an authentication factor;
storing the authentication factor in association with the at least one communications channel identifier;
transmitting the authentication factor embedded in a hyperlink to the client device of the user via the received at least one communications channel identifier;
receiving, from the client device of the user in response to selection of the hyperlink by the user, the authentication factor without requiring the user to manually enter the authentication factor;
comparing the received authentication factor to the stored authentication factor; and
verifying, in response to determining that the received authentication factor matches the stored authentication factor, ownership by the user of the communications channel identifier.

12. A computer system for one-click two-factor authentication, the computer system comprising:
a remote server including a processor; and
a non-transitory, tangible, computer-readable storage medium having instructions stored thereon that, in response to execution by the processor, cause the remote server to perform operations comprising:
receiving at least one communications channel identifier from a client device;
generating, in response to the receiving, an authentication factor;
transmitting the authentication factor embedded in a hyperlink to the client device of the user via the received at least one communications channel identifier;
receiving, from the client device of the user in response to selection on the client device of the hyperlink by the user, the authentication factor without requiring the user to manually enter the authentication factor;
comparing the received authentication factor to the stored authentication factor; and
verifying, in response to determining that the received authentication factor matches the stored authentication factor, ownership by the user of the communications channel identifier.

13. The computer system of claim 12, wherein the communications channel identifier is at least one of: (a) an email address, and (b) a telephone number.

14. The computer system of claim 12, wherein the remote server is further configured to perform operations comprising:
parsing the hyperlink in response to selection by the user of the hyperlink; and extracting the authentication factor from the hyperlink.

15. The computer system of claim 12, wherein the remote server is further configured to perform operations comprising granting access to an Application in response to selection of the hyperlink by the user.

* * * * *